United States Patent
Yamane et al.

(10) Patent No.: US 11,909,012 B2
(45) Date of Patent: Feb. 20, 2024

(54) HIGH-VOLTAGE APPARATUS AND VEHICLE

(71) Applicant: HONDA MOTOR CO., LTD., Tokyo (JP)

(72) Inventors: Kazuto Yamane, Wako (JP); Yoshimichi Tsubata, Wako (JP); Tomohiro Higaki, Wako (JP); Hiroshi Kosaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 16/991,206

(22) Filed: Aug. 12, 2020

(65) Prior Publication Data

US 2021/0057785 A1 Feb. 25, 2021

(30) Foreign Application Priority Data

Aug. 20, 2019 (JP) .................... 2019-150462

(51) Int. Cl.
| | | |
|---|---|---|
| H01M 10/48 | (2006.01) | |
| H01M 10/42 | (2006.01) | |
| G01M 3/04 | (2006.01) | |
| B60K 1/04 | (2019.01) | |
| H01M 50/20 | (2021.01) | |

(52) U.S. Cl.
CPC .............. *H01M 10/48* (2013.01); *B60K 1/04* (2013.01); *G01M 3/04* (2013.01); *H01M 10/425* (2013.01); *H01M 50/20* (2021.01); *B60K 2001/0416* (2013.01); *H01M 2220/20* (2013.01)

(58) Field of Classification Search
CPC .... H01M 10/48; H01M 10/425; H01M 50/20; G01M 3/04; B60K 1/04
See application file for complete search history.

(56) References Cited

U.S. PATENT DOCUMENTS

2014/0011058 A1* 1/2014 Adachi ................... B60L 50/66
429/61

FOREIGN PATENT DOCUMENTS

| | | |
|---|---|---|
| CN | 101662003 | 3/2010 |
| EP | 2159862 | 3/2010 |
| JP | 2011-195069 | 10/2011 |
| JP | 2012-119307 | 6/2012 |
| JP | 2014-013723 | 1/2014 |
| JP | 2014-036016 | 2/2014 |
| JP | 2015-026428 | 2/2015 |
| JP | 2016-141353 | 8/2016 |
| JP | 2019-040700 | 3/2019 |

OTHER PUBLICATIONS

Japanese Office Action for Japanese Patent Application No. 2019-150462 dated Mar. 22, 2022.
Chinese Office Action for Chinese Patent Application No. 202010673828.9 dated Apr. 13, 2023.

* cited by examiner

*Primary Examiner* — Sarah A. Slifka
(74) *Attorney, Agent, or Firm* — Amin, Turocy & Watson, LLP

(57) ABSTRACT

A high-voltage apparatus includes a battery unit, a case that includes a circumferential wall section in which a cable insertion port that opens sideways is formed and that is configured to accommodate the battery unit, and a water detection sensor that is disposed at a portion located adjacent to the circumferential wall section below the cable insertion port inside the case and that is configured to detect water that has entered the case.

9 Claims, 5 Drawing Sheets

HIGH-VOLTAGE APPARATUS AND VEHICLE

CROSS-REFERENCE TO RELATED APPLICATION

Priority is claimed on Japanese Patent Application No. 2019-150462, filed Aug. 20, 2019, the content of which is incorporated herein by reference.

BACKGROUND OF THE INVENTION

Field of the Invention

The present invention relates to a high-voltage apparatus and a vehicle.

Description of Related Art

A high-voltage apparatus including a battery unit is mounted on an electric vehicle such as an electric automobile, a plug-in hybrid, or the like. For example, Japanese Unexamined patent application, First Publication No. 2012-119307 discloses a high-voltage apparatus that is disposed inside an undercover provided on a vehicle rear section.

Incidentally, when a water level outside a vehicle is increased by heavy rainfall, flooding, or the like, water enters the vehicle, and a high-voltage apparatus may be exposed to water. Here, Japanese Unexamined patent application, First Publication No. 2012-119307 discloses a configuration in which a water level detection sensor is provided in an undercover on which a high-voltage apparatus is disposed. According to the configuration, when it is detected by the water level detection sensor that a water level in the undercover is a reference value or more, a water pump is driven to discharge the water in the undercover.

SUMMARY OF THE INVENTION

However, in the above-mentioned related art, there is a room for further improvement in detecting the water entering an undercover more quickly.

An aspect of the present invention is directed to providing a high-voltage apparatus capable of quickly detecting entry of water into a case.

(1) A high-voltage apparatus according to an aspect of the present invention includes a battery unit; a case that includes wall section in which an opening section that opens upward or sideways is formed and that is configured to accommodate the battery unit; and a liquid detection sensor that is disposed at a portion located adjacent to the wall section below the opening section inside the case and that is configured to detect liquid that has entered the case.

(2) In the high-voltage apparatus according to the aspect of the above-mentioned (1), the battery unit may include: a battery module in which a plurality of battery cells are stacked in a first direction; and a frame member that is configured to surround the battery module and that holds the battery module, and a lower end position of the liquid detection sensor may be disposed above a lowest end of the frame member and below a lowest end of the battery module.

(3) In the high-voltage apparatus according to the aspect of the above-mentioned (1) or (2), the liquid detection sensor may be disposed between the wall section of the case and the battery unit, and a shock absorbing member extending toward the wall section further than the liquid detection sensor may be provided on the battery unit.

(4) In the high-voltage apparatus according to any one aspect of the above-mentioned (1) to (3), the case may include: a bottom wall section disposed below the battery unit; and the wall section that stands upward from an outer circumferential edge of the bottom wall section and that surrounds the battery unit from a side thereof, a liquid reservoir may be formed on the bottom wall section, and the liquid detection sensor may be disposed in a vicinity of the liquid reservoir.

(5) A vehicle according to an aspect of the present invention is a vehicle on which the high-voltage apparatus according to any one of the above-mentioned (1) to (4) is mounted, and the liquid detection sensor is disposed further forward in the vehicle with respect to the battery unit at inside the case.

(6) In the vehicle according to the aspect of the above-mentioned (5), the liquid detection sensor may be disposed in a central section of the case in a vehicle width direction.

(7) In the vehicle according to the aspect of the above-mentioned (5) or (6), the high-voltage apparatus may be disposed in a lower space of a luggage compartment defined behind a seat.

According to the aspect of the above-mentioned (1), since the liquid detection sensor is disposed adjacent to the wall section, water entering the case through the opening section is easily detected by the liquid detection sensor. In addition, since the liquid detection sensor is disposed below the opening section, the liquid stored in the lower section of the case is easily detected by the liquid detection sensor. For this reason, it is easy to quickly detect entry of water into the case, and damage (short circuiting or the like) to the battery unit can be minimized.

According to the aspect of the above-mentioned (2), since the lower end position of the liquid detection sensor is disposed above the lowest end of the frame member, it is possible to prevent the liquid detection sensor from coming in contact with an installation surface upon conveyance when the battery unit is assembled and conveyed or the like. In addition, when the battery unit is assembled through the upper end opening section of the case, it is possible to prevent the liquid detection sensor from coming in contact with the bottom wall section of the case.

As a result, it is possible to prevent the liquid detection sensor from being damaged before assembly of the high-voltage apparatus.

Meanwhile, since the liquid detection sensor is disposed below the lowest end of the battery module, entry of water into the case can be detected before the battery cell or the bus bar between the cells is exposed to water.

According to the aspect of the above-mentioned (3), for example, upon input of an impact load via the wall section, the impact load can be absorbed by the shock absorbing member before the liquid detection sensor. For this reason, an impact load transmitted to the liquid detection sensor can be reduced, and damage on the liquid detection sensor can be minimized.

According to the aspect of the above-mentioned (4), since the liquid entering the case is stored in the liquid reservoir, it is easy to prevent the battery unit from being exposed to water. Moreover, since the liquid detection sensor is disposed in the vicinity of the liquid reservoir, it is easy to detect entry of liquid into the case before the battery unit is exposed to water.

According to the aspect of the above-mentioned (5), upon deceleration or the like, since the liquid in the case is moved forward by inertia, the liquid in the case is easily detected by the liquid detection sensor.

According to the aspect of the above-mentioned (6), the liquid accumulated in the lower section in the case is collected in a direction opposite to a turning direction through the central section in the vehicle width direction upon leftward and rightward turning of the vehicle, and stored in the central section in the vehicle width direction during straight ahead traveling. For this reason, during traveling, it is easy to stably detect entry of liquid into the case.

According to the aspect of the above-mentioned (7), even when the high-voltage apparatus is disposed at a position far from a driver, entry of liquid into the case can be rapidly detected by the liquid detection sensor as described above.

DETAILED DESCRIPTION OF THE INVENTION

Figure 1:
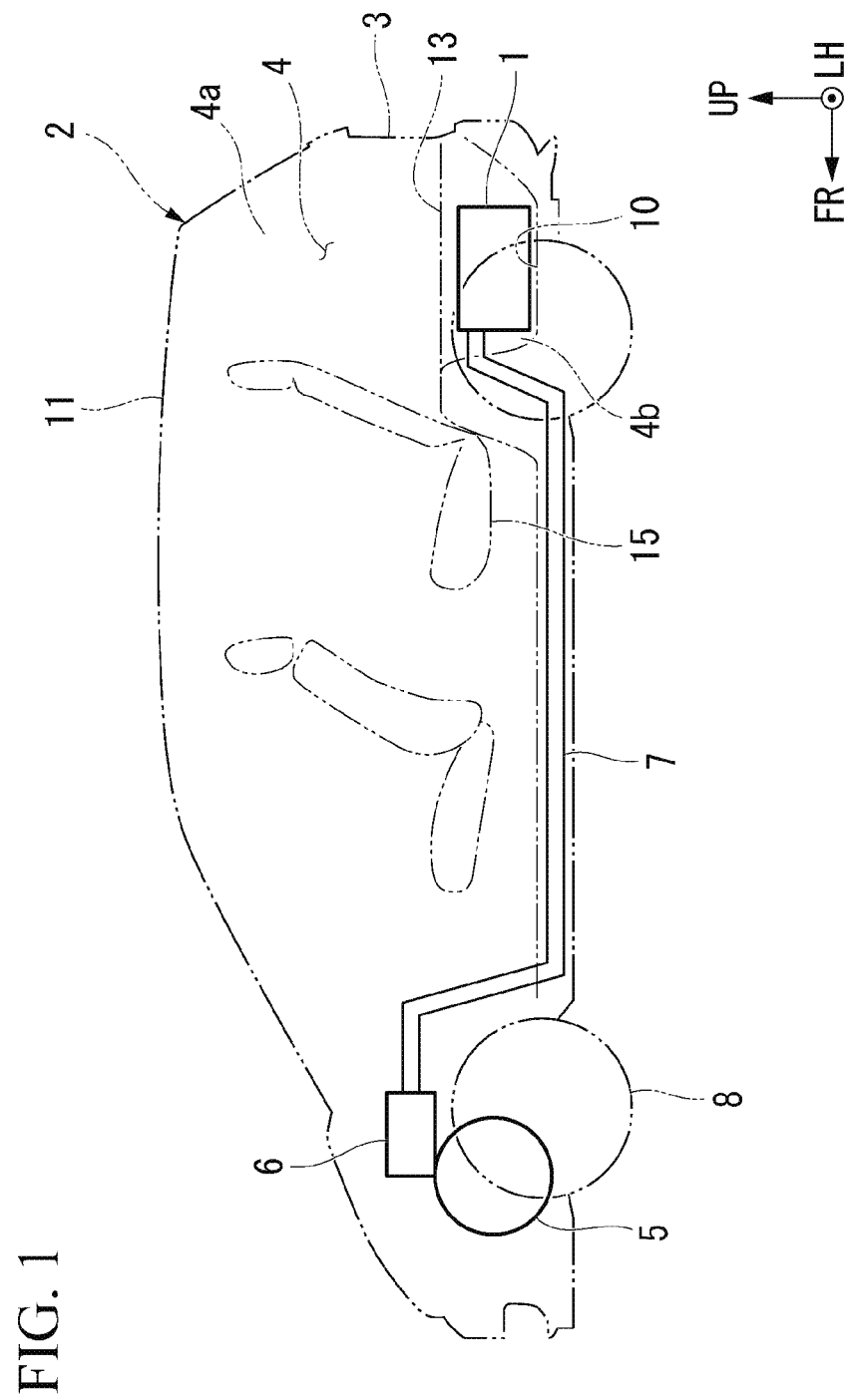
FIG. 1 is a schematic view of an electric vehicle according to an embodiment.

Hereinafter, an embodiment of the present invention will be described with reference to the accompanying drawings. In the following description, directions of forward, rearward, upward, downward, leftward and rightward in the following description are the same as directions in an electric vehicle 2 described below unless the context clearly indicates otherwise. In this case, an arrow FR in the drawings indicates a forward direction with respect to the electric vehicle 2, an arrow UP indicates an upward direction with respect to the electric vehicle 2, and an arrow LH indicates a leftward direction with respect to the electric vehicle 2. Further, in the following description, for example, expression of relative or absolute arrangement such as "parallel," "perpendicular," "central," "coaxial," or the like, does not only strictly represent such arrangement but also represents a state of relative displacement with a tolerance, an angle or a distance at which the same function is obtained.

[Electric Vehicle 2]

FIG. 1 is a schematic view of the electric vehicle 2.

As shown in FIG. 1, a high-voltage apparatus 1 of the embodiment is mounted on the electric vehicle 2. In the embodiment, the electric vehicle 2 is a vehicle such as an electric automobile, a hybrid vehicle, or the like, that is driven by electric power. That is, the electric vehicle 2 of the embodiment includes a motor 5 serving as a driving source, a power control unit (PCU) 6 serving as a driving control part, and the high-voltage apparatus 1 serving as a power source (a power supply).

The motor 5 is disposed on a front section of the electric vehicle 2. The motor 5 is connected to a wheel 8 via a speed reducer or the like.

The PCU 6 is disposed on the front section of the electric vehicle 2 in the vicinity of the motor 5. The PCU 6 includes an inverter configured to perform direct current/alternating current voltage conversion between the motor 5 and the high-voltage apparatus 1, a DC/DC converter configured to perform step-up and step-down of an alternating current voltage, or the like. A first high voltage cable 7 (for example, a DC cable or the like) is extracted from the PCU 6. The first high voltage cable 7 is routed to a rear section of the electric vehicle 2 through below the floor of the electric vehicle 2.

Here, the electric vehicle 2 of the embodiment is a so-called hatchback type vehicle having a rear end opening section that can be opened and closed by a tailgate 3. In the electric vehicle 2, a luggage compartment 4 is formed in a rear section of the vehicle body. Specifically, the luggage compartment 4 is defined by an undercover 10 that constitutes a bottom wall, a pair of side linings (not shown) that constitute both sidewalls in a leftward/rightward direction, a roof panel 11 that constitutes a ceiling, and the tailgate 3 that constitutes a rear wall.

The luggage compartment 4 is partitioned into an upper space 4a and a lower space 4b by a floor board 13. The upper space 4a communicates with a living space through above a rear seat 15. Various items of luggage can be placed on the floor board 13 in the upper space 4a. Meanwhile, the lower space 4b is defined by the undercover 10 and the floor board 13.

<High-Voltage Apparatus 1>

Figure 2:
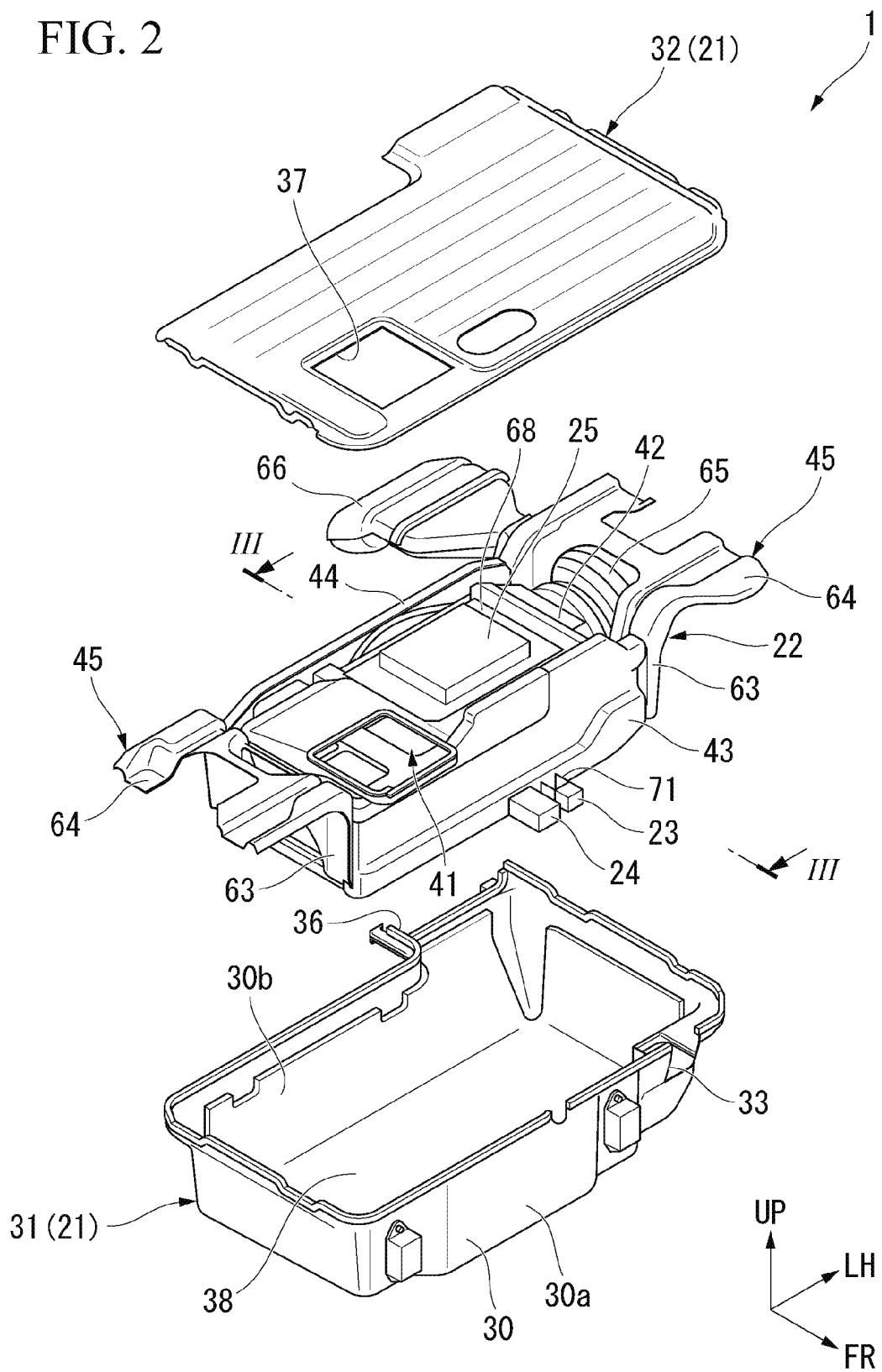
FIG. 2 is an exploded perspective view of a high-voltage apparatus according to the embodiment.

FIG. 2 is an exploded perspective view of the high-voltage apparatus 1.

As shown in FIG. 2, the high-voltage apparatus 1 is accommodated in the above-mentioned lower space 4b. The high-voltage apparatus 1 includes a case 21, a battery unit 22, a water detection sensor (a liquid detection sensor) 23, a shock absorbing member 24 and a battery electronic control unit (ECU) 25.

<Case 21>

The case 21 includes an accommodating section 31 and a lid section 32.

The accommodating section 31 is formed in a box shape that opens upward. The accommodating section 31 has a rectangular shape in which a vehicle width direction is a lengthwise direction when seen in a plan view. In a circumferential wall section 30 of the accommodating section 31, a cable insertion port (an opening section) 33 is formed in an upper edge of a front wall section 30a. The cable insertion port 33 is formed in a U shape that opens upward. The first high voltage cable 7 routed from the PCU 6 is inserted into the cable insertion port 33. Further, the above-mentioned circumferential wall section 30 stands upward from an outer circumferential edge of a bottom wall section 38 in the accommodating section 31 and surrounds the battery unit 22 from a side thereof.

Meanwhile, in the circumferential wall section 30 of the accommodating section 31, an exhaust duct insertion port 36 is formed in an upper edge of a rear wall section 30b. The exhaust duct insertion port 36 is formed in a U shape that opens upward. Further, each of the insertion ports 33 and 36 is not limited to a U shape and may open in an O shape or the like. That is, each of the insertion ports 33 and 36 may be open on one side (in the forward/rearward direction or the vehicle width direction) of the circumferential wall section 30. In addition, these ports are not limited to the insertion ports 33 and 36 for a wiring or a duct and various opening sections may be formed.

The lid section 32 is formed in, for example, a flat plate shape. The lid section 32 closes an upper end opening section of the accommodating section 31. Accordingly, upper end opening sections of the above-mentioned insertion ports 33 and 36 are closed. Further, in the embodiment, although the case in which the case 21 is constituted by the box-shaped accommodating section 31 and the flat-plate-shaped lid section 32 has been described, the embodiment is not limited to this configuration. That is, a shape of the case 21 may be appropriately changed as long as a space configured to accommodate the battery unit 22 is formed.

An intake port 37 is formed in a front section of the lid section 32. The intake port 37 opens upward. An intake duct (not shown) is connected to the intake port 37. The intake duct opens in the living space, for example, on the side of the rear seat 15. Air is introduced into the case 21 through the intake duct.

<Battery Unit 22>

The battery unit 22 is accommodated in the case 21. The battery unit 22 includes a battery module 41, a junction board 42, a front frame 43 (a frame member), a rear frame 44 (a frame member) and hanger brackets 45.

Figure 3:
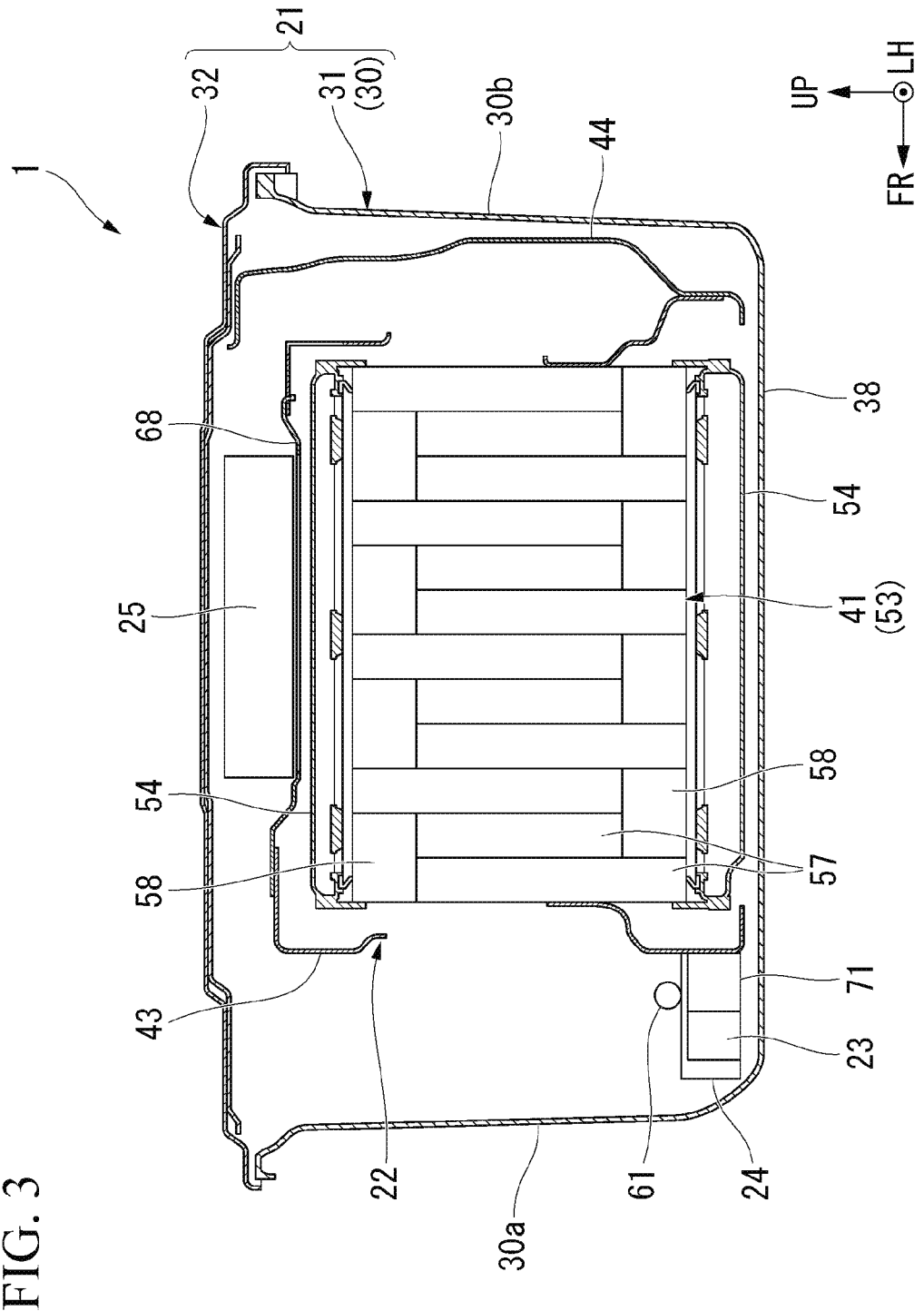
FIG. 3 is a cross-sectional view according to line in FIG. 2.
Figure 4:
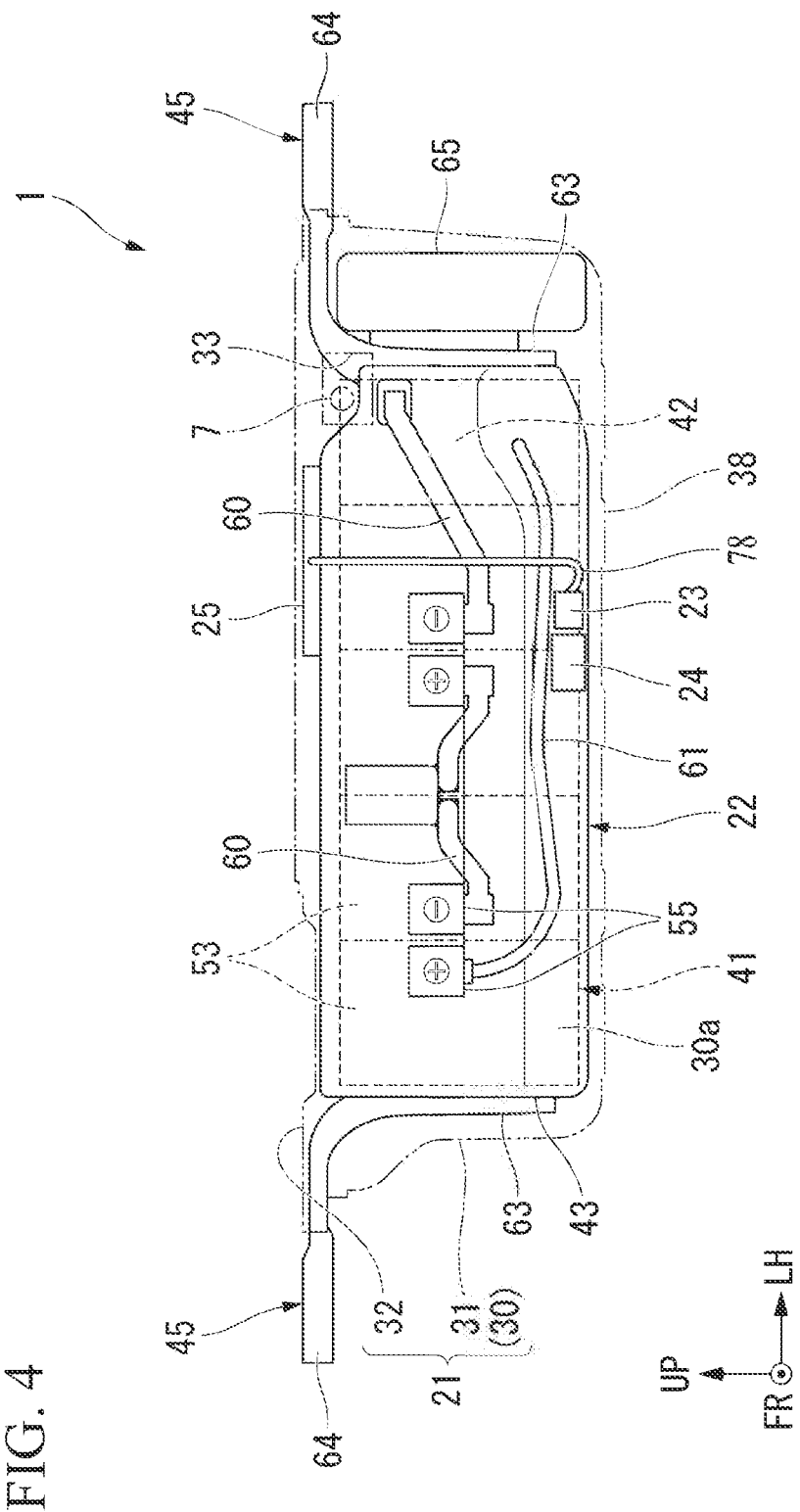
FIG. 4 is a front view of a high-voltage apparatus showing a state when looking through an accommodating section.

FIG. 3 is a cross-sectional view along line in FIG. 2. FIG. 4 is a front view of the high-voltage apparatus 1 showing a state when looking through the accommodating section 31.

As shown in FIG. 3 and FIG. 4, the battery module 41 includes cell stacks 53, a stack holding frame 54 (a frame member) and stack terminals 55.

The cell stacks 53 are arranged in a plurality of rows in the vehicle width direction (see FIG. 4). Each of the cell stacks 53 is configured by stacking a plurality of battery cells 57 in a forward/rearward direction (a first direction) (see FIG. 3). The battery cells 57 are formed in, for example, a rectangular plate shape. The battery cells 57 are stacked in a state in which the thickness direction coincides with the forward/rearward direction. The neighboring battery cells 57 are connected to each other by bus bars 58 between the cells. The bus bars 58 between the cells are arranged on one side in the vehicle width direction of the battery cells 57 (a left side in an example shown) at intervals in the upward/downward direction. The bus bars 58 between the cells connect, for example, positive cell terminals and negative cell terminals of neighboring battery cells 57 in parallel. Further, the battery cells 57 may be stacked in the vehicle width direction.

The stack holding frame 54 surrounds the cell stacks 53 and individually holds the cell stacks 53.

As shown in FIG. 4, the stack terminals 55 are provided on both of front and rear sides of the cell stacks 53. In the cell stacks 53 neighboring in the vehicle width direction, the stack terminals 55 oriented in the same direction are connected to each other via stack bus bars 60.

As shown in FIG. 2, the junction board 42 is disposed on one side of the battery module 41 in the vehicle width direction. The cell stack 53 closest to the junction board 42, among the above-mentioned cell stacks 53, is connected to the junction board 42 via the stack bus bar 60. In addition, the first high voltage cable 7 guided into the case 21 through the cable insertion port 33 is connected to an upper section of the junction board 42. Meanwhile, a second cable 61 is extracted from a lower section of the junction board 42. The second cable 61 is extracted toward the other side in the vehicle width direction (a right side in the example shown) in front of the front frame 43. The second cable 61 is connected to the cell stack 53 farthest from the junction board 42, among the cell stacks 53.

As shown in FIG. 3, the front frame 43 is provided in front of the battery module 41. The rear frame 44 is provided behind the battery module 41. Each of the frames 43 and 44 is formed in a plate shape extending in the vehicle width direction. The frames 43 and 44 sandwich the battery module 41 therebetween from both of front and rear sides and hold the battery module 41 together. Further, a weight reducing hole (not shown) is appropriately provided in the front frame 43 or the rear frame 44. The above-mentioned stack terminals 55 or a second high voltage cable 61 protrude outward from the frames 43 and 44 through the weight reducing hole.

The hanger brackets 45 are disposed on both sides of the battery module 41 in the vehicle width direction. Each of the hanger brackets 45 is formed in an L shape when seen in a front view. Specifically, the hanger brackets 45 include vertical extension sections 63 and overhanging sections 64.

The vertical extension sections 63 extend from the battery module 41 in the upward/downward direction on both sides in the vehicle width direction, respectively. The vertical extension sections 63 bridge the front and rear frames 43 and 44 on both sides of the battery module 41 in the vehicle width direction.

The overhanging sections 64 extend outward from upper end portions of the vertical extension sections 63 in the vehicle width direction (a direction in which they are separated from each other). The overhanging sections 64 are extracted outward from the case 21 through a space between an upper edge of the accommodating section 31 and the lid section 32. The overhanging sections 64 are fixed to a skeleton member (for example, a rear side member or the like) of the electric vehicle 2 on an outward side of the case 21. Further, in a state in which the hanger brackets 45 are fixed to the skeleton member of the electric vehicle 2, the battery unit 22 is separated upward from the bottom wall section 38 of the accommodating section 31.

A cooling fan 65 is provided on an outward side in the vehicle width direction of the hanger bracket 45 disposed on one side in the vehicle width direction of the hanger brackets 45. As shown in FIG. 2, an exhaust duct 66 is connected to the cooling fan 65. The exhaust duct 66 is extracted outward from the case 21 through the exhaust duct insertion port 36. That is, since the air in the case 21 is suctioned by the cooling fan 65, the air flows toward one side from the other side in the vehicle width direction and then is discharged through the exhaust duct 66. Further, the exhaust duct 66 opens in, for example, the undercover 10.

The battery ECU 25 is disposed above the battery module 41. Specifically, the battery ECU 25 is attached onto an ECU bracket 68 that bridges between the front frame 43 and the rear frame 44, which are described above.

<Water Detection Sensor 23>

As shown in FIG. 2 to FIG. 4, the water detection sensor (the liquid detection sensor) 23 detects existence of water in the case 21. The water detection sensor 23 is attached to a lower end portion of the front frame 43 via a sensor bracket 71. The sensor bracket 71 is provided on the lower end portion of the front frame 43 while protruding forward from a central section in the vehicle width direction. The water detection sensor 23 is provided on the front end portion of the sensor bracket 71 while protruding forward. Accordingly, the water detection sensor 23 is disposed in the vicinity of the front wall section 30a from behind.

In the embodiment, the water detection sensor 23 is disposed below the above-mentioned cable insertion port 33. Specifically, a lower end of the water detection sensor 23 is disposed above the lowest end of the battery unit 22 (for example, the front frame 43) and below the lowest end of the battery module 41 (the lowest end of the stack holding frame 54). However, the water detection sensor 23 may be disposed, for example, above the lowest end of the battery module 41 and below the lowest end of the bus bar 58 between the cells as long as the water detection sensor 23 is disposed below the cable insertion port 33.

In addition, the water detection sensor 23 is disposed on a central section in the vehicle width direction. Specifically, the water detection sensor 23 is disposed at a position adjacent to the cable insertion port 33 with respect to a center in the vehicle width direction. However, the position of the water detection sensor 23 in the vehicle width direction can be appropriately changed. The water detection sensor 23 may be disposed, for example, at the same position as the cable insertion port 33 in the vehicle width direction.

Further, as shown in FIG. 4, a sensor cable 78 is extracted from the water detection sensor 23. The sensor cable 78 slackens downward and then extends upward. That is, the lowest end of the sensor cable 78 is disposed below the lowest end of the water detection sensor 23. The upper end portion of the sensor cable 78 is connected to the battery ECU 25.

<Shock Absorbing Member 24>

The shock absorbing member 24 is disposed at the substantially same position as the water detection sensor 23 in the upward/downward direction and a position adjacent to the water detection sensor 23 in the vehicle width direction. The shock absorbing member 24 is, for example, a so-called honeycomb structure in which cylindrical sections extending in the forward/rearward direction are arranged. The shock absorbing member 24 is configured to be compressible prior to input of an impact from the front. The shock absorbing member 24 protrudes forward from the front frame 43. A front end of the shock absorbing member 24 is positioned further forward than the front end of the water detection sensor 23. The above-mentioned second cable 61 extends above the water detection sensor 23 or the shock absorbing member 24 in front of the front frame 43. The second cable 61 is disposed behind the front end of the water detection sensor 23. Further, the shock absorbing member 24 may be disposed at, for example, a position shifted with respect to the water detection sensor 23 in the upward/downward direction as long as an impact load is input thereto before the water detection sensor 23 or the battery module 41.

[Effects]

In the electric vehicle 2, during heavy rainfall or flooding, for example, water may enter the case 21 through the cable insertion port 33. The water entering the case 21 flows downward through the case 21 and is easily collected in the lower section of the case 21.

Here, in the embodiment, the configuration in which the water detection sensor 23 is disposed on a portion of the case 21 which is close to the front wall section 30*a* and which is below the cable insertion port 33 has been disclosed.

According to the configuration, since the water detection sensor 23 is disposed adjacent to the front wall section 30*a*, the water entering the case 21 through the cable insertion port 33 is easily detected by the water detection sensor 23. In addition, since the water detection sensor 23 is disposed below the cable insertion port 33, the water collected in the lower section of the case 21 is easily detected by the water detection sensor 23. For this reason, quick detection of entry of the water into the case 21 can be facilitated, and damage (short circuiting or the like) on the battery unit 22 can be minimized.

In the embodiment, the configuration in which the water detection sensor 23 is disposed above the lowest end of the frames 43 and 44 and below the lowest end of the battery module 41 has been disclosed.

According to the configuration, since the water detection sensor 23 is disposed above the lowest end of the frames 43 and 44, contact of the water detection sensor 23 with the installation surface upon conveyance can be minimized when the battery unit 22 is assembled and conveyed. In addition, when the battery unit 22 is assembled through the upper end opening section of the accommodating section 31, it is possible to prevent the water detection sensor 23 from contacting the bottom wall section 38 of the accommodating section 31.

As a result, it is possible to prevent the water detection sensor 23 from being damaged before assembly of the high-voltage apparatus 1.

Meanwhile, since the water detection sensor 23 is disposed below the lowest end of the battery module 41, before the battery cells 57 or the bus bars 58 between the cells are exposed to water, entry of the water into the case 21 can be detected.

In the embodiment, the configuration in which the shock absorbing member 24 protruding forward from the water detection sensor 23 is provided has been disclosed.

According to the configuration, for example, upon input of an impact load from the front, the impact load can be absorbed by the shock absorbing member 24 before the water detection sensor 23. For this reason, an impact load transmitted to the water detection sensor 23 can be reduced, and damage on the water detection sensor 23 can be minimized. Further, the impact load that cannot be completely absorbed by the shock absorbing member 24 in the impact load input to the shock absorbing member 24 is absorbed in a process of transmitting the impact load through the front frame 43, the hanger brackets 45, or the like, as a load path.

In the embodiment, the configuration in which the sensor cable 78 extending from the water detection sensor 23 slackens downward and then is routed upward has been disclosed.

According to the configuration, for example, it is possible to prevent water adhered to the sensor cable 78 due to condensation or the like from reaching the water detection sensor 23 along the sensor cable 78. Accordingly, false detection by the water detection sensor 23 can be minimized.

In the embodiment, the configuration in which the water detection sensor 23 is further forward in the battery unit 22 in the case 21 has been disclosed.

According to the configuration, upon deceleration or the like, since water in the case 21 is moved forward by inertia, the water in the case 21 is easily detected by the water detection sensor 23.

In the embodiment, the configuration in which the water detection sensor 23 is disposed on the central section of the case 21 in the vehicle width direction has been proposed.

According to the configuration, the water collected in the lower section of the case 21 is collected in the direction opposite to the turning direction through the central section in the vehicle width direction upon leftward and rightward turning of the electric vehicle 2, and is stored in the central section in the vehicle width direction during straight ahead traveling. For this reason, it is easy to stably detect entry of water into the case 21 during traveling.

In the embodiment, the configuration in which the high-voltage apparatus 1 is disposed in the lower space 4*b* of the luggage compartment 4 has been disclosed.

According to the configuration, even when the high-voltage apparatus 1 is disposed far from a driver, entry of water into the case 21 can be quickly detected by the water detection sensor 23 as described above.

[Variant]

Figure 5:
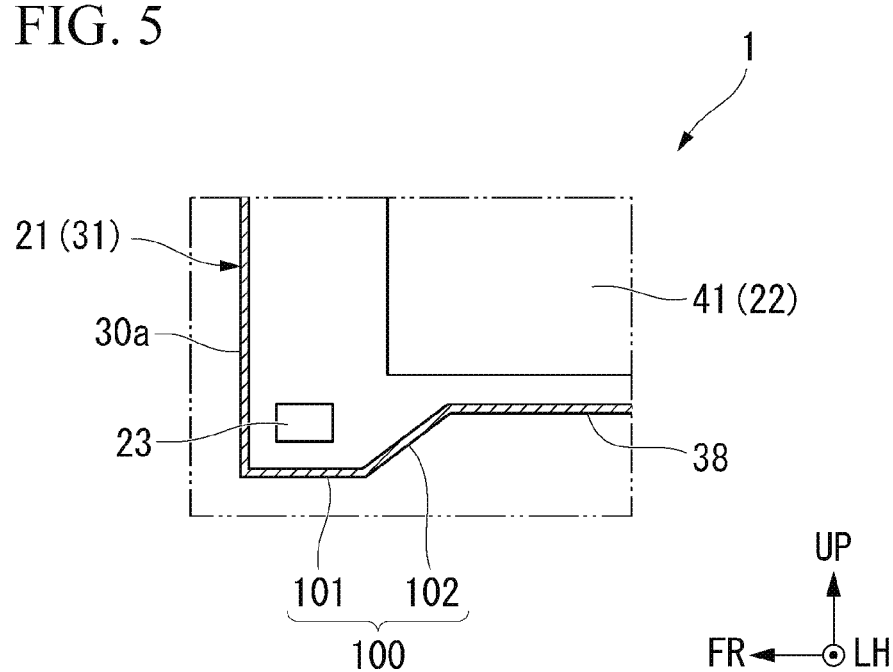
FIG. 5 is a partial cross-sectional view of a high-voltage apparatus according to a variant.

Next, a variant will be described. FIG. 5 is a partial cross-sectional view of the high-voltage apparatus 1 according to the variant. The variant is distinguished from the above-mentioned embodiment in that a water reservoir 100 (a liquid reservoir) is formed in the case 21. Further, in the following description, components the same as those in the above-mentioned embodiment are designated by the reference signs and description thereof will be omitted.

In the case 21 shown in FIG. 5, the water reservoir 100 is formed in the front section of the bottom wall section 38. The water reservoir 100 is recessed downward from the bottom wall section 38 of the water reservoir 100. The water reservoir 100 preferably includes a tapered section 102 that gradually inclines downward toward a bottom section 101. The above-mentioned water detection sensor 23 is disposed in the water reservoir 100.

According to the configuration, since the water entering the case 21 is stored in the water reservoir 100, it is easy to prevent the battery unit 22 from being exposed to water.

In particular, since the water detection sensor 23 is disposed in the water reservoir 100, entry of water into the case 21 is easily detected before the battery unit 22 is exposed to the water.

Figure 6:
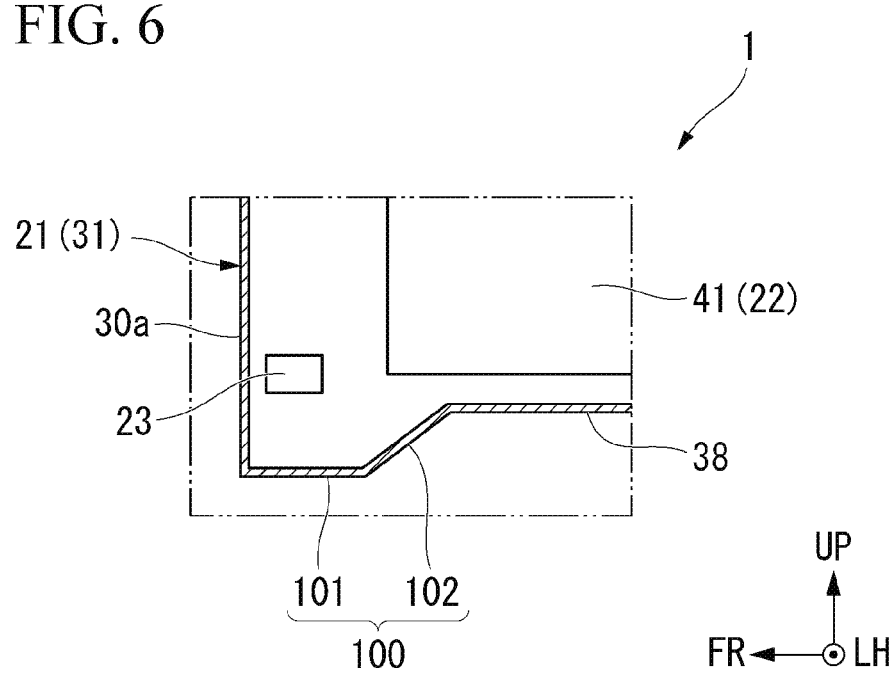
FIG. 6 is a partial cross-sectional view of a high-voltage apparatus according to a variant.

Further, while the configuration in which the water detection sensor 23 is disposed in the water reservoir 100 has been described in the above-mentioned variant, there is no limitation to this configuration. For example, the water reservoir 100 may be disposed above the water reservoir 100 as shown in FIG. 6 as long as the water reservoir 100 is disposed in the vicinity of the water reservoir 100.

[Other Variants]

Hereinabove, while the preferred examples of the present invention have been described, the present invention is not limited to these examples. Additions, omissions, substitutions, and other modifications to the components may be made without departing from the scope of the present invention. The present invention is not limited to the above-mentioned description and is limited by only the accompanying claims.

For example, while the configuration in which the water detection sensor 23 is provided on the side of the battery unit 22 has been described in the above-mentioned embodiment, there is no limitation thereto, and a configuration in which the water detection sensor 23 is provided on the side of the case 21 (for example, the circumferential wall section 30) may be provided.

While the configuration in which the water detection sensor 23 is provided in front of the battery unit 22 has been described in the above-mentioned embodiment, there is no limitation thereto. A configuration in which the water detection sensor 23 is provided outside, behind or below the battery unit 22 in the vehicle width direction may be provided.

While the cable insertion port 33 serving as an opening section into which water is likely to enter has been exemplarily described in the above-mentioned embodiment, there is no limitation thereto. Water may enter the case 21 through the opening section that opens sideways or upward, and the configuration of the present invention may be applied irrespective of the position at which the opening section is formed. In this case, the opening section may be formed in the lid section 32.

While the configuration in which the high-voltage apparatus 1 is disposed in the lower space 4b has been described in the above-mentioned embodiment, there is no limitation thereto.

While the configuration in which the high-voltage apparatus 1 is mounted on the electric vehicle 2 has been described in the above-mentioned embodiment, there is no limitation thereto. The high-voltage apparatus 1 may be mounted on an apparatus other than the vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A high-voltage apparatus comprising:
    a battery unit;
    a case that includes a lid section, an accommodating section, and a wall section disposed between the lid section and the accommodating section,
    wherein the accommodating section is located to collect liquid that has entered the case,
    wherein the wall section comprises an opening section that opens into the case,
    wherein the wall section is configured to accommodate the battery unit, and
    wherein the opening section opens, between the lid section and the accommodating section, in a direction towards the lid section or wherein the opening section opens, between the lid section and the accommodating section, in a direction initially inward into the accommodating section or outward from the accommodating section; and
    a liquid detection sensor that is configured to detect liquid that enters the case,
    wherein the liquid detection sensor is disposed at a sensor portion of the case located adjacent to the wall section and below the opening section inside the case, and
    wherein a cable extending from the liquid detection sensor slackens first downward from the liquid detection sensor, towards the accommodating section, and then extends upward towards the lid section.

2. The high-voltage apparatus according to claim 1, wherein the battery unit comprises:
    a battery module in which a plurality of battery cells are stacked in a first direction; and
    a frame member that is configured to surround the battery module and that holds the battery module, and
    a lower end position of the liquid detection sensor, lower towards the accommodating section than the lid section, is disposed above a lowest end, being lower towards the accommodating section than towards the lid section, of the frame member and below a lowest end, being lower towards the accommodating section than towards the lid section, of the battery module.

3. The high-voltage apparatus according to claim 1, wherein the liquid detection sensor is disposed between the wall section of the case and the battery unit, and
    a shock absorbing member extending toward the wall section further than the liquid detection sensor is provided on the battery unit.

4. The high-voltage apparatus according to claim 1, wherein the case comprises:

a bottom wall section disposed below the battery unit at a side of the battery unit opposite the lid section; and the wall section that extends upward, in a direction towards the lid section, from an outer circumferential edge of the bottom wall section and that surrounds the battery unit along a side of the battery unit, and wherein a liquid reservoir is formed on the bottom wall section, and the liquid detection sensor is disposed at least partially within the liquid reservoir.

5. The high-voltage apparatus according to claim 1, mounted at a vehicle,
wherein the liquid detection sensor is disposed further forward in the vehicle with respect to the battery unit at inside the case.

6. The high-voltage apparatus according to claim 5, wherein the liquid detection sensor is disposed in a central section of the case in a vehicle width direction of the vehicle.

7. The high-voltage apparatus according to claim 5, wherein the high-voltage apparatus is disposed in a lower space of a luggage compartment defined behind a seat of the vehicle.

8. The high-voltage apparatus according to claim 3, wherein the shock absorbing member is disposed at a position adjacent to the liquid detection sensor in the vehicle width direction of a vehicle at which the high-voltage apparatus is mounted.

9. The high-voltage apparatus according to claim 8, wherein, with respect to the liquid detection sensor in the vehicle width direction, the shock absorbing member is disposed at a side opposite to a side in which the opening section is provided.

* * * * *